Nov. 22, 1927.
J. EDMAN
1,649,817
INTERNAL COMBUSTION ENGINE
Filed April 19, 1924     2 Sheets-Sheet 1
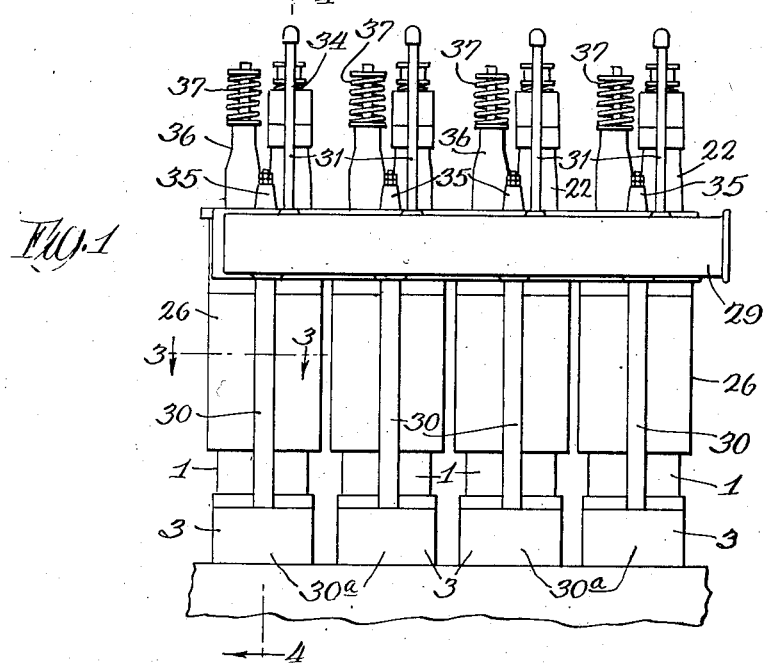
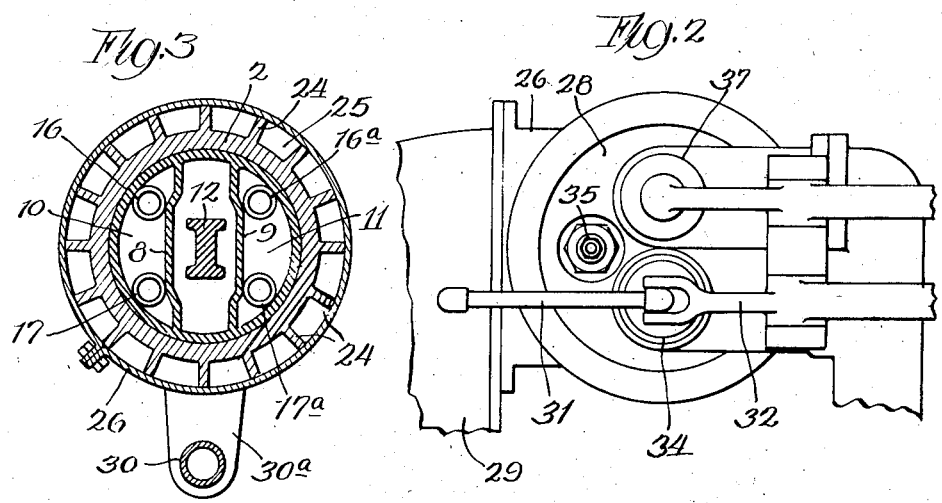
Inventor:
John Edman
by Parker & Carter Atty's.

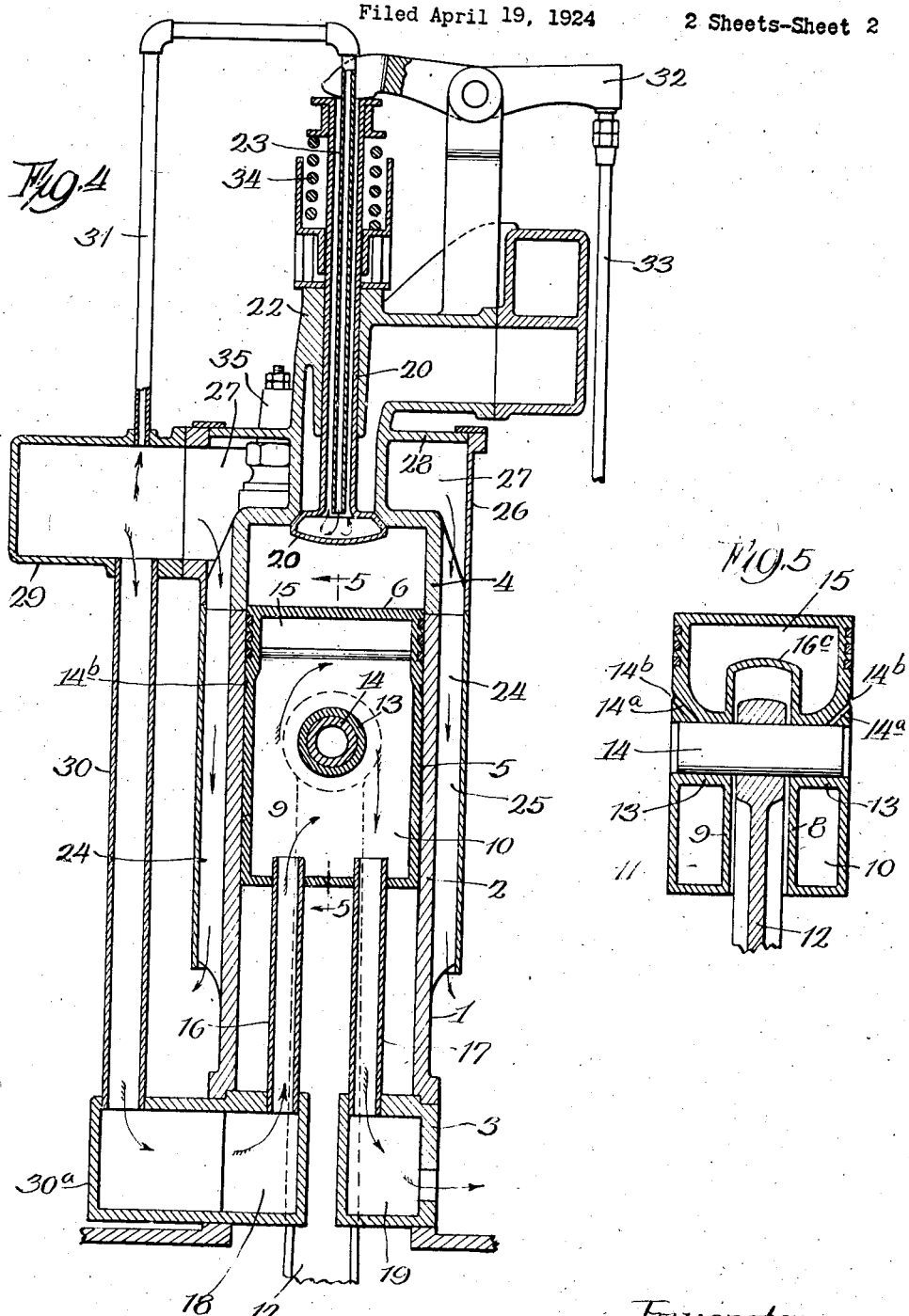

Patented Nov. 22, 1927.

1,649,817

UNITED STATES PATENT OFFICE.

JOHN EDMAN, OF MINNEAPOLIS, MINNESOTA, ASSIGNOR TO MASTERBILT MOTOR COMPANY, OF MINNEAPOLIS, MINNESOTA, A CORPORATION OF SOUTH DAKOTA.

INTERNAL-COMBUSTION ENGINE.

Application filed April 19, 1924. Serial No. 707,649.

This invention relates to an internal combustion engine and has for its object to provide a new and improved device of this description. One of the defects in an internal combustion engine of the present type is the inability to get a high compression without preignition. One of the objects of this invention is to provide an engine which will be free from this defect and permit a much higher compression than is at present attainable without preignition. Another defect in such engines is the overheating of the exhaust valve. This invention has as a further object to remedy this defect.

The invention has as a further object to provide an internal combustion engine with means for cooling the piston of the engine by air by means of an effective, inexpensive and durable construction. The invention has as a further object to cool the cylinder by means of air. The invention has as a further object to provide means for cooling the valves by means of air. The invention has further objects which are more particularly pointed out in the accompanying description.

Referring to the drawings,

Fig. 1 is a side elevation of one form of engine embodying the invention with parts omitted;

Fig. 2 is a plan view of one of the cylinders;

Fig. 3 is a cross sectional view taken on line 3—3 of Fig. 1;

Fig. 4 is an enlarged vertical sectional view taken on line 4—4 of Fig. 1;

Fig. 5 is a sectional view through the piston taken on line 5—5 of Fig. 4;

Like numerals refer to like parts throughout the several figures.

I have illustrated the invention as applied to an engine having a plurality of cylinders 1. Each of the cylinders as shown, for example in Fig. 4, is made up of three sections, a central section 2, a base section 3 and a top section 4. Within each cylinder is a piston 5, which has a continuous top 6. Means is provided for circulating air through the pistons for cooling them. For this purpose I provide a construction where the pistons are provided with one or more enlarged air chambers with means for admitting and discharging air therefrom, the air chambers preferably being considerably larger in cross sectional area than the means for discharging the air so that the air will not circulate in a current, but the chamber will be filled with air and some of the air remain therein for a period rather than passing directly through in a curent so that the air may more effectively act to absorb the heat from the piston. Stating it another way, there is an air conduit for circulating air through the piston wherein the portion of said conduit consists of the chamber in the piston which is of greater cross sectional area than the discharge pipe so that there is a storage of the air in the piston for an appreciable time. In the construction illustrated the piston 5 is provided with the longitudinally extending walls 8 and 9 forming air chambers or reservoirs 10 and 11 which extend longitudinally along the piston. These walls are separated by a space in which the connecting rod 12 works. The walls 8 and 9 are connected to the outer walls of the piston by the hollow members 13 which form the bearings for the wrist pin 14. It will be noted that these wrist pin bearings project across the air chamber and are completely surrounded by air so as to be cooled. This prevents them from getting sufficiently heated to injure the oil and hence prevents them from becoming worn so as to cause the wrist pin to become loose. The wrist pins are oiled in any suitable manner as by means of the oil holes 14ª which communicate with the oil groove 14ᵇ extending around the piston and which gather oil from the inner face of the cylinder and force it through the holes 14ª into the bearings of the wrist pin. The chambers or reservoirs 10 and 11 extend from the bottom to the top of the piston and are connected together at the top by the cross chamber 15. The walls 8 and 9 are connected together at the top by the cross wall 16ᶜ. Connected with the base portion 3 of the cylinders are the stationary hollow members 16 and 17. There are four stationary hollow members, two communicating with each of the chambers 10 and 11, the hollow members 16 and 17 communicating with chambers 10 and members 16ᵃ and 17ᵃ communicating with chamber 11. The hollow members 16 and 17 are connected to the base portion 3 in any desired manner. The base member 3 is provided with the passageways 18 with which the hollow stationary members 16 communicate and with the horizontal or lateral passageways 19 with which the hollow stationary members 17 communicate. The upper ends of the stationary hollow members 16 and 17 project into the piston so as to permit the piston to move up and down along them. In the construction shown, these members slide in openings in the bottom of the piston. Air passes into the passageways 18 and along the hollow members 16 and then into the chambers 10 where it absorbs heat from the piston remaining an appreciable time in the piston for this purpose and passes out through the hollow stationary members 17 and out through the passageway 19.

It will thus be seen that two currents of air pass into the piston by means of the members 16 and 17 and 16ᵃ and 17ᵃ, and that these currents of air come to contact with the outer walls of the piston and with different interior walls, namely the walls 8 and 9. Some of the air passes across from one chamber to the other at the top of the piston through the cross chamber 15. It will thus be seen that a large cooling surface is provided for the air and that in view of the storage feature of the air in the piston, that is, the feature by which there is more air in the piston than can pass in a continuous current out through the discharge, this air is given ample opportunity to absorb the large amount of heat from the piston. The exhaust valves 20 of the engine are made hollow and the valve stems 21 connected therewith are also hollow, such valve stems reciprocating in casings 22. An air inlet pipe 23 of smaller cross sectional area than the hollow of the valve stem projects into the valve stem to a point sufficient to force the air into the hollow valve, this air absorbing heat in the hollow valve and escaping out through the space between the pipe 23 and the inner walls of the valve stem 20. The cylinders of the engine are provided with a series of heat dissipating ribs or wings 24, see Figs. 3 and 4, having spaces 25 between them. An outer covering 26 is provided, which passes over the cylinder and the ribs, and which passes above the upper ends of the ribs, there being provided an air chamber 27 from which air passes down through the spaces 25 between the ribs to cool the cylinder. This air chamber in the construction shown is formed between a flange 28 and the top of the cylinder and the cover 26. Air is admitted into the various chambers in any suitable manner. As herein shown, I provide an air conduit 29 which extends along the several cylinders. The chamber 27 communicates with this air conduit, as shown in Fig. 4, so that air therefrom passes between the casings 26 and the cylinders. Pipes 30 communicate with the conduit 29 and with the passage-ways 18, as shown in Figure 4. Pipes 31 connect the conduit 29 with the inlet pipes 23 of the valves 20. The valves 20 are moved from their seats in any of the usual ways, as by means of the pivoted levers 32, which engage the end thereof, and which are moved by the rods 33 controlled by cams in the usual manner. The springs 34 return the valves to their seats.

It will thus be seen that in this construction the top of the piston is cooled as well as the body of the piston, and that the interior wall of the top of the piston is always in contact with cooling air. It will further be seen that the exterior of the cylinder is also cooled by a confined current of air, and that the exhaust valves of the engine are also cooled by a confined current of air.

It will further be seen that the cross sectional area of the air reservoirs in the piston are considerably larger than the cross sectional area of the exhaust pipe, thereby insuring the air remaining in the piston a sufficient time to absorb the large quantity of heat. I have found by experiment that with a machine of this construction I am able to secure a very high compression in the cylinders, as for example, a compression of 120 pounds without pre-ignition, this being due to the efficient cooling of the piston and the cylinder, and that I am also able to keep the exhaust valve in a proper cooled condition. Any suitable means is used for supplying air to the air conduit 29. Only a small amount of pressure is required to do the work, and it may be supplied by a fan run from the engine. The explosive mixture enters the cylinder through the admission 36 and the valve therein is provided with the spring 37.

The cover 26 for the cylinder is preferably made of some material such as copper or brass which absorbs heat more quickly than the metal of the cylinder and the ribs.

It will be noted that the chambers 10 and 11 and the cross chamber 15 are so arranged as to form a reservoir opposite the entire contacting wall of the piston as well as the top and bottom thereof. The outer walls of this air reservoir constitute the entire outer walls of the piston so that the cool air comes into contact with the inner face of the entire outer wall of the piston. It will further be seen that the entire cylindrical wall and the top and bottom walls of the piston form the outer walls of the air storage reservoir.

It will be noted that the piston is hollow and is provided with two internal substantially parallel walls which extend entirely across the piston and which are integral with the wall of the piston. These walls divide the piston into three substantially parallel hollow portions. This forms a strong, durable, hollow piston which is not injured by the expansion and contraction due to changes in temperature. The central, hollow portion contains the piston connecting rod and the adjacent outside hollow portions are provided with means for passing air therethrough. It is found in practice that the air in addition to cooling the outer wall of the piston, cools these substantially parallel internal walls and since they are integral with the piston outer wall, they conduct the heat from such outer wall as they are cooled by the air and prevent the formation of carbon in the cylinders of the invention. The hollow members 13 which are integral with these walls and with the outer piston wall extend across the air reservoirs and also assist in conducting the heat away from the outer walls.

I claim:

1. An internal combustion engine comprising a cylinder, a piston in said cylinder, an air storage space in said piston the outer walls of the air storage space constituting the entire outer walls of the piston, a base for said cylinder provided with separated air passageways, connections between said separated air passageways and said piston, and means for inserting air in said piston and withdrawing it therefrom through said connections while the piston is in operation, air remaining in the piston an appreciable time after being inserted so that it may absorb heat from the piston before being discharged.

2. An internal combustion engine comprising a cylinder, a hollow piston therein, said piston having two separated longitudinally extending walls extending entirely across the piston, and between which the piston connecting rod passes and which divide the piston into two longitudinally extending air reservoirs, means for admitting air into and exhausting air from said reservoirs, hollow members projecting across each of said reservoirs so as to be surrounded by the air therein and acting as bearings for the wrist pin of the piston connecting rod.

3. An internal combustion engine comprising a cylinder, a hollow piston therein, said piston having two separated longitudinally extending walls extending entirely across the piston, and between which the piston connecting rod passes and which divide the piston into two longitudinally extending air reservoirs, means for admitting air into and exhausting air from said reservoirs, the exhausting means being smaller in cross sectional area than the air reservoir so as to permit the air to remain an appreciable time in the reservoir before being exhausted, air passageways on the outside of said cylinder and means for forcing air through said latter air passageways.

4. An internal combustion engine comprising a cylinder, a hollow piston therein, said piston having two separated longitudinally extending walls extending entirely across the piston, and between which the piston connecting rod passes and which divide the piston into two longitudinally extending air reservoirs, a base connected with said cylinder, a plurality of hollow members connected with said base and working in openings in the bottom of the piston and forming communication with the air reservoirs therein and means for connecting certain of said hollow members with a source of air supply.

5. An internal combustion engine comprising a cylinder, a hollow piston therein having its end integral with the body portion, said piston having two separated longitudinally extending walls between which the piston connecting rod passes and which divide the piston into two longitudinally extending air reservoirs, means for admitting two separate currents of air into said piston, one into each of said air reservoirs.

6. An internal combustion engine comprising a cylinder, a hollow piston therein, said piston having two separated longitudinally extending walls extending entirely across the piston, and between which the piston connecting rod passes and which divide the piston into two longitudially extending air reservoirs, means for admitting air into and exhausting air from said reservoirs, and a cross connection between said air reservoirs, at the top of the piston, the wrist pin bearings extending across said reservoir so as to be exposed to the air therein and a hollow wrist pin working in said bearings.

7. An internal combustion engine comprising a cylinder, a hollow piston therein, said piston having two separated longitudinally extending walls extending entirely across the piston, and between which the connecting rod passes and which divide the piston into two longitudinally extending air reservoirs, bearings for the wrist pin of the piston extending across said reservoirs so as to be surrounded by air and means for admitting air into and exhausting air from said reservoirs.

8. An internal combustion engine comprising a cylinder, a hollow piston therein, said piston having two separated substantially parallel internal walls which extend entirely across the piston and which are integral with the outer wall of said piston, said internal walls dividing the piston into three substantially parallel, hollow portions.

9. An internal combustion engine comprising a cylinder a hollow piston therein, said piston having two separated substantially parallel internal walls which extend entirely across the piston and which are integral with the outer wall of said piston, said internal walls dividing the piston into three substantially parallel, hollow portions, hollow members extending across the two outer hollow spaces and integral with said internal walls and the outer wall of the piston, and means for passing air through said outer hollow spaces.

Signed at Chicago county of Cook and State of Illinois, this 18th day of April, 1924.

JOHN EDMAN.